(12) United States Patent
Case, Jr.

(10) Patent No.: US 9,965,051 B2
(45) Date of Patent: May 8, 2018

(54) INPUT DEVICE TRACKING

(71) Applicant: Microsoft Technology Licensing, LLC, Redmond, WA (US)

(72) Inventor: Charlie W. Case, Jr., Lake Oswego, OR (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days. days.

(21) Appl. No.: 15/197,593

(22) Filed: Jun. 29, 2016

(65) Prior Publication Data

US 2018/0004311 A1   Jan. 4, 2018

(51) Int. Cl.
*G06F 3/0346* (2013.01)
*G06F 3/0354* (2013.01)

(52) U.S. Cl.
CPC ........ *G06F 3/0346* (2013.01); *G06F 3/03545* (2013.01)

(58) Field of Classification Search
CPC .......................... G06F 3/0346; G06F 3/03545
USPC ....................................................... 345/179
See application file for complete search history.

(56) References Cited

U.S. PATENT DOCUMENTS 6,015,204 A * 1/2000 Ha ......................... B41J 19/202
                                                                347/37
6,389,354 B1 * 5/2002 Hicks ................... G01C 21/005
                                                                340/970
8,970,625 B2    3/2015 Chavez et al.
9,212,869 B1 * 12/2015 Boardman ............ G01S 13/726
2006/0279549 A1  12/2006 Zhang et al.
(Continued)

FOREIGN PATENT DOCUMENTS

DE    10114891 A1    10/2002
EP     0971308 A1     1/2000
EP     2540226 A1     1/2013

OTHER PUBLICATIONS

Yoon, et al., "TMotion:Embedded 3D Mobile Input using Magnetic Sensing Technique", In Adjunct Proceedings of 28th Annual ACM Symposium on User Interface Software & Technology, Nov. 8, 2015, pp. 71-72.

(Continued)

*Primary Examiner* — Fred Tzeng
(74) *Attorney, Agent, or Firm* — Alleman Hall Creasman & Tuttle LLP

(57) ABSTRACT

Examples are disclosed for tracking a location of an input device. One example provides a display device including a logic machine and a storage machine, the storage machine storing instructions executable by the logic machine to generate, based on position sensor data received from a position sensor of an input device, an estimated location of the input device that is repeatedly updated as further position sensor data is received. The instructions are further executable to determine that the input device is in a home state associated with the display device, determine, with a sensing mechanism of the display device, a home-state location of the input device, reset the estimated location based on the home-state location, such that future updates to the estimated location are based on the reset estimated location, and control the display device based at least on the estimated location of the input device.

20 Claims, 7 Drawing Sheets

(56) References Cited

U.S. PATENT DOCUMENTS

| | | | |
|---|---|---|---|
| 2009/0212995 A1* | 8/2009 | Wu | G01S 5/0278 |
| | | | 342/109 |
| 2011/0208496 A1* | 8/2011 | Bando | G01S 19/49 |
| | | | 703/2 |
| 2012/0019488 A1 | 1/2012 | McCarthy | |
| 2014/0062875 A1 | 3/2014 | Rafey et al. | |
| 2014/0306891 A1 | 10/2014 | Latta et al. | |
| 2015/0212602 A1 | 7/2015 | Lor et al. | |
| 2015/0370350 A1 | 12/2015 | Hunt et al. | |
| 2016/0069690 A1* | 3/2016 | Li | G01C 21/206 |
| | | | 701/412 |
| 2016/0283792 A1* | 9/2016 | Okazaki | G06K 9/00664 |

OTHER PUBLICATIONS

Segev, Liron, "How to calibrate galaxy note S pen", Published on: Jun. 26, 2012 Available at: http://thetechieguy.com/how-to-calibrate-galaxy-note-s-pen/.

Madgwick, Seb, "Oscillatory Motion Tracking With x-IMU", Published on: Nov. 3, 2013 Available at: http://www.x-io.co.uk/oscillatory-motion-tracking-with-x-imu/.

Ko, et al., "A Measurement System for 3D Hand-Drawn Gesture with a PHANToMTM Device", In Journal of Information Processing Systems, vol. 6, No. 3, Sep. 2010, pp. 347-358.

Wang, et al., "An Inertial-Measurement-Unit-Based Pen with a Trajectory Reconstruction Algorithm and Its Applications", In Journal of IEEE Transactions on Industrial Electronics, vol. 57, No. 10, Oct. 2010, pp. 3508-3521.

\* cited by examiner

INPUT DEVICE TRACKING

BACKGROUND

Computing systems may receive input from input devices utilizing a sensing mechanism, such as touch and hover detection. Typically, these mechanisms rely on the computing system to directly detect a location and state of the input device. Accordingly, the input device may only provide input to the computing system when in range of such proximity-bound sensing mechanisms.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A display device receives position sensor information from an input device to determine an estimated location of the input device relative to the display device. The estimated location of the input device is repeatedly updated as further position sensor data is received. The estimated location may be reset based on determining that the input device is in a home state associated with the display device, so that future updates to the estimated location of the input device are based on the reset estimated location.

DETAILED DESCRIPTION

As computing environments evolve, the ways in which users may interact with computing systems expand. For example, more flexible input mechanisms than traditional wired keyboard/mouse arrangements provide increased freedom of movement/positioning of input devices and expanded input capabilities that are no longer limited to button actuations. One area of input mechanism development relates to the use of touch sensors, which detect input devices that are brought close to or in contact with the sensors. Touch sensor detection may be used to track the position of the input device over time, which may be translated into cursor movement controls, gesture input detection, handwriting detection, and/or other controls/inputs. However, touch sensor detection, and other similar mechanisms, rely on a proximity of the input device to the sensor.

In order to accommodate input devices that may be used at a distance from an associated display device, one or more cameras may be used to image the input device. However, such cameras may involve lengthy setup times, and detection may be limited by the field of views of the cameras. The present disclosure provides example input device tracking in which the input device monitors its own pose while away from the display (e.g., in an away state), and sends an indication of the pose to the display device. The display device may then estimate a location of the input device, which may be reset once the input device enters a home state relative to the display device. In this way, the pose of the input device may be estimated regardless of the location of the input device relative to the display device. Furthermore, any drift or other errors associated with input device-based pose monitoring may be zeroed out upon the input device coming into range of a display device-based location sensor (e.g., a more accurate location estimation mechanism than the position sensor of the input device).

Examples are also described regarding adaptive learning techniques, which may include analyzing and correlating the drift or errors encountered for different away state behaviors of the input device. The adaptive learning techniques may further include deriving offsets associated with the various away state behaviors based at least on the drift/errors encountered during a time period in which the input device exhibits such behaviors. The offsets may also take into account display device state, input device state, and/or user information associated with the time period. In this way, the location estimate of the input device in an away state may become more accurate over time.

Figure 1A:
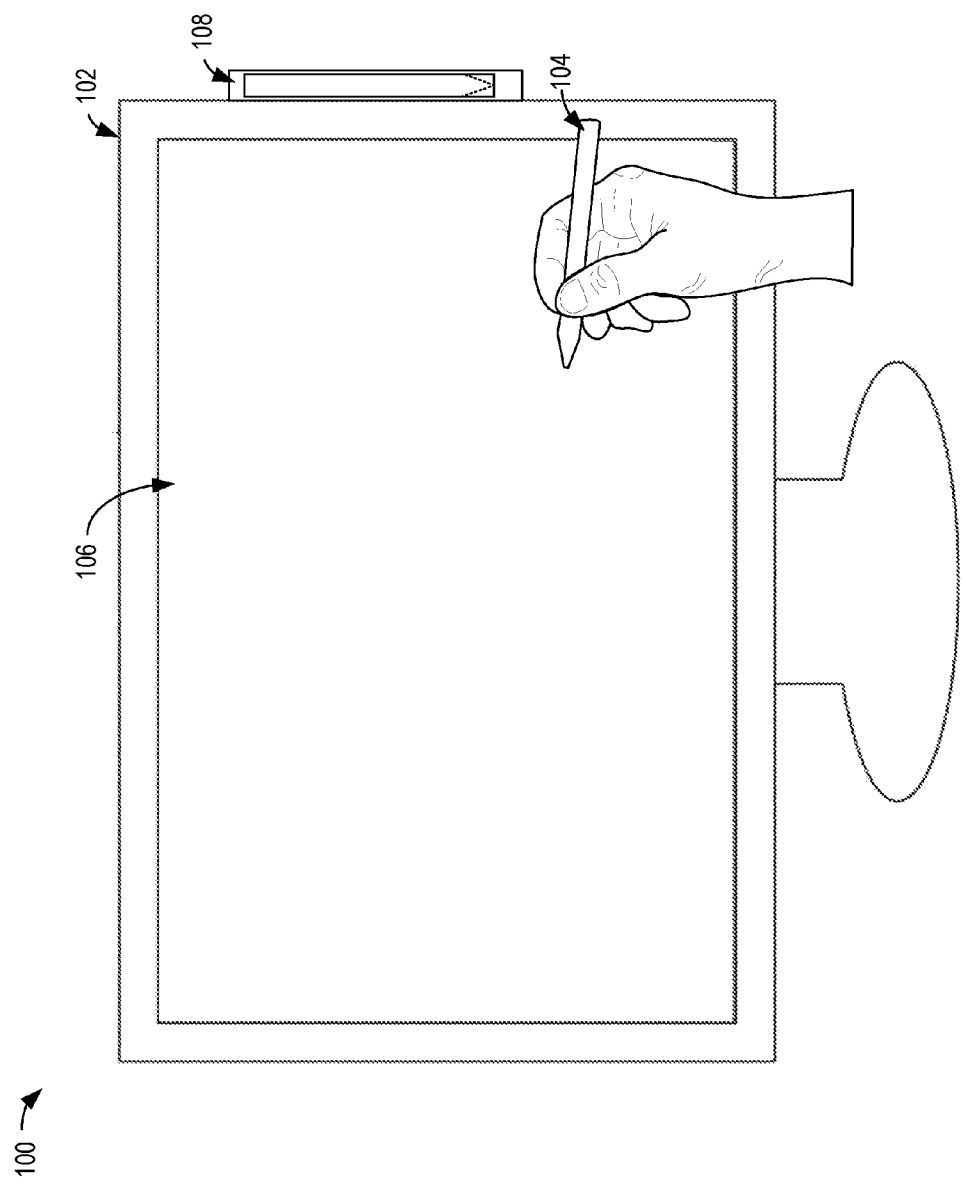
FIGS. 1A-1C show an example input environment for providing input to a display device while an input device is in different states.
Figure 2:
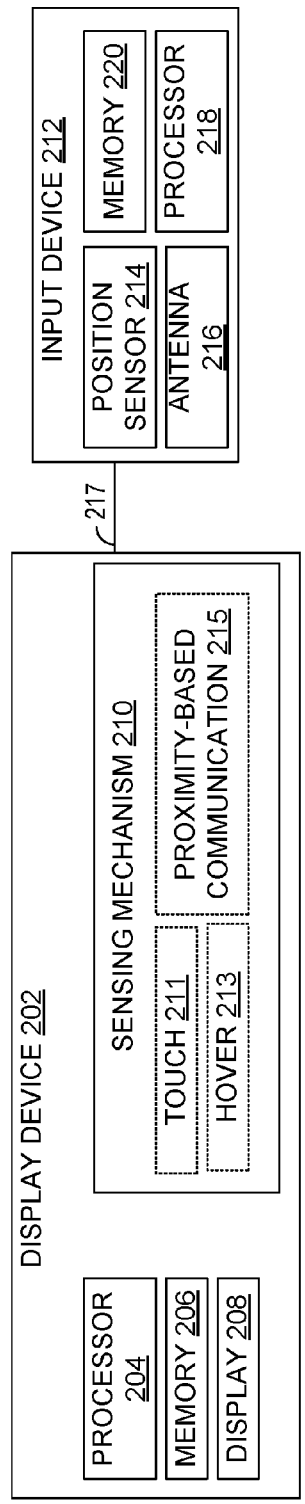
FIG. 2 shows a block diagram of a display device and an input device for providing inputs to the display device.

FIG. 1A shows an example input environment 100 in which a computing device such as display device 102 may receive input from an input device 104. The input from input device 104, such as a stylus, may be received and processed in order to control aspects of the display device, such as content that is displayed via a display 106 of the display device 102. For example, the input device may provide input to a user interface and/or otherwise be monitored to control an application or operating system executed on the display device. Turning briefly to FIG. 2, display device 202, which may be an example of display device 102 of FIG. 1A, may include a processor 204 and memory 206 that stores instructions executable by the processor to perform one or more of the methods described herein. For example, the memory 206 may store executables and/or other data that is processed by the processor 204 in order to run one or more applications or an operating system, interpret received data, issue control commands, and/or perform other functions. The instructions may be executed to control an output of display 208, which may be an example of display 106 of FIG. 1A.

Returning to FIG. 1A, a dock 108 may be mounted to, integrated with, and/or otherwise configured such that it has a known location relative to display device 102. For example, the location of dock 108 may be stored on a storage device of the display device. Dock 108 may be shaped to receive input device 104 and/or may include mechanisms for retaining input device 104. In some examples, dock 108 may provide power for charging the input device 104 via one or more terminals of the dock. The terminals, retaining mechanism, and/or another sensing device integrated in the dock may detect the input device when the input device is docked and/or within a threshold distance of the dock.

Figure 1C:
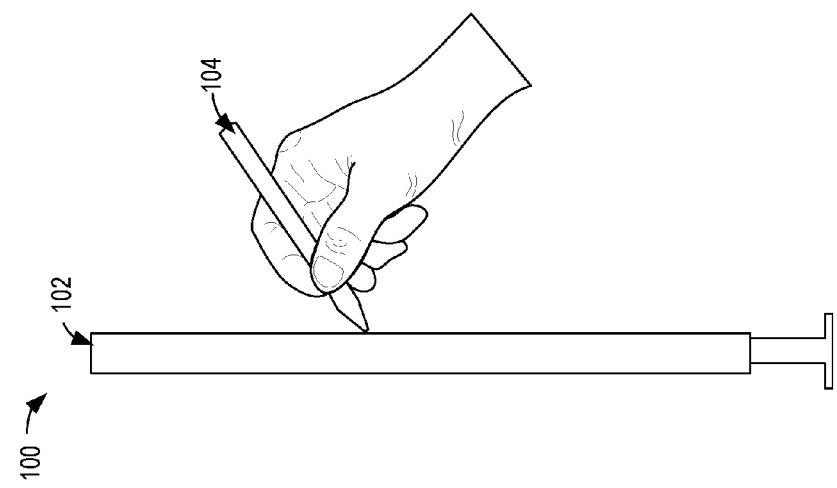
Figure 1B:
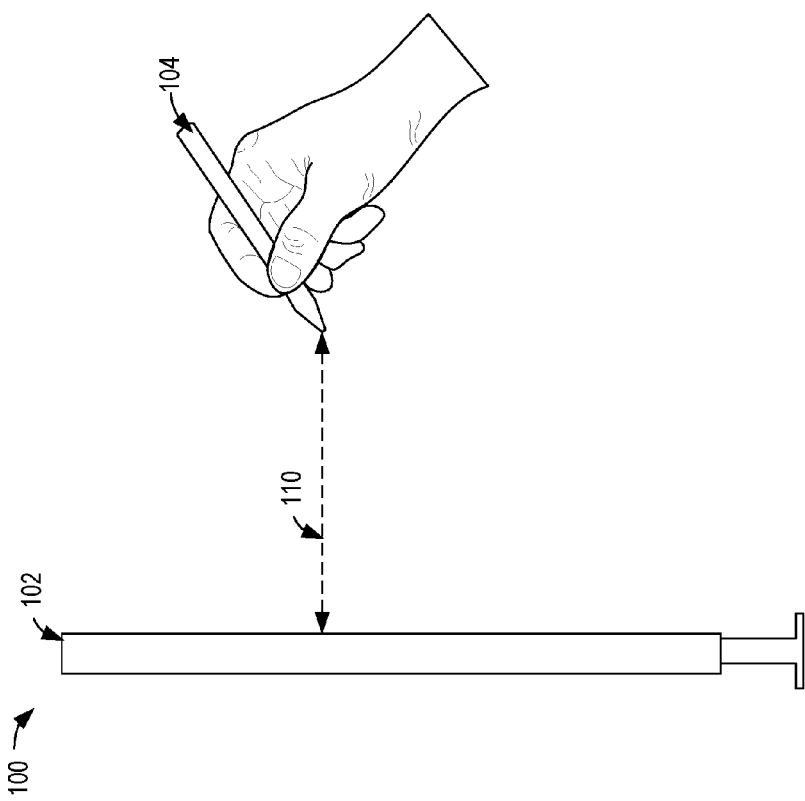

FIGS. 1B and 1C show examples of an away state of the input device and a home state of the input device, respectively. As shown in FIG. 1B, an away state of the input device may include a state in which the input device is positioned outside of a threshold distance of the display device (as represented by distance measurement 110). In some examples, the threshold distance may correspond to a range of a sensing mechanism of the display device. For example, as shown in FIG. 2, the display device may include a sensing mechanism (e.g., sensing mechanism 210), such as a touch sensor 211, a hover sensor 213, and/or a proximity-based (e.g., short-range, such as near-field communication) communication subsystem 215. In examples where the display device includes a touch sensor, the input device may enter the home state upon coming into contact with the touch sensor (e.g., a surface of the display). In examples where the display device includes a hover sensor, the input device may enter the home state upon coming within a threshold distance (e.g., a range) of the hover sensor (e.g., the surface of the display). In examples where the display device includes a proximity-based communication subsystem, the input device may enter the home state upon coming into range of the communication subsystem (e.g., upon determining that the input device is able to communicate via the proximity-based communication subsystem).

When the input device is outside of the range of such sensing mechanisms, as shown in FIG. 1B, the location of the input device may be estimated based on position sensor data from a position sensor of the input device. For example, as shown in FIG. 2, an input device 212 (which may be an example of input device 104 of FIGS. 1A-1C) may include a position sensor 214, such as an inertial measurement unit (IMU). The position sensor 214 may track a pose of the input device in three dimensions and with six degrees of freedom and output position sensor data indicating the pose (e.g., the location in three-dimensional space, the angular position/orientation in three-dimensional space, the rotation of the input device relative to a reference pose, the movement of the input device relative to a reference location, and/or other positional information). Examples of the position sensor 214 may include one or more gyroscopes, accelerometers, and/or other sensors capable of tracking the positional information described above.

The position sensor data may be output to the display device via antenna 216 and/or another communication interface that sends data over communication link 217. In some examples, the data from the position sensor may be processed by processor 218 and/or stored in memory 220 prior to being communicated to the display device 202. For example, the input device may convert raw position sensor data into coordinates based on movements of the input device relative to a last-estimated position of the input device. In other examples, the input device may just pass along raw or relatively unprocessed sensor data, such that the bulk of the processing occurs at the display device.

The position sensor data of the input device may be expressed in values relative to a starting pose in three-dimensional space. Over time, and based on the behavior of the input device during tracking, the position sensor data may drift and/or accumulate errors, causing the output of the position sensor to differ from the actual pose of the input device. In order to reduce the accumulation of such drift/errors, the estimated location of the input device may be reset periodically. The position sensor data may be interpreted relative to the estimated location at a reset time, such that the position sensor data indicates movement away from the estimated location at the reset time.

As the sensing mechanism of the display device may be more accurate and/or less prone to drift than the position sensor of the input device, the display device may determine a home-state location of the input device using the sensing mechanism that is local to the display device. The home-state location may be estimated responsive to the input device entering a home state (e.g., coming within a threshold distance of the display device as shown in FIG. 1C and/or having a position within a dock such as dock 108 of FIG. 1A).

Figure 3:
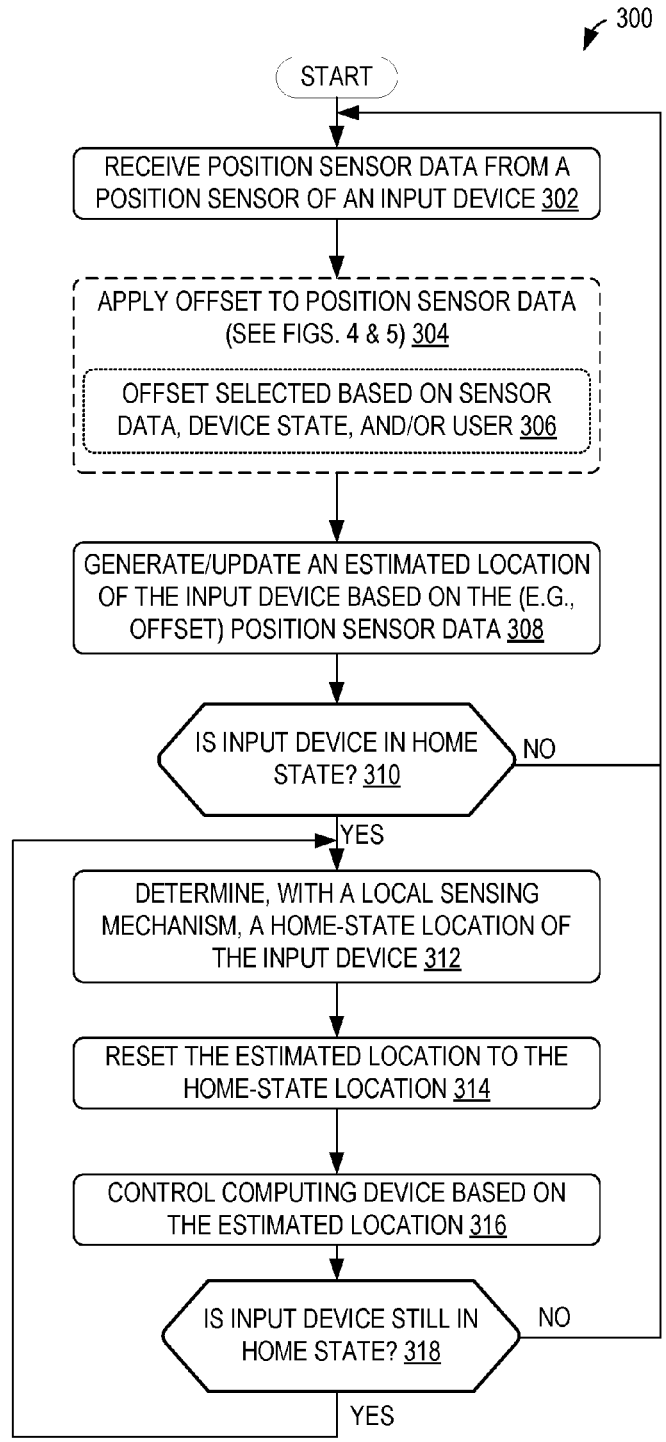
FIG. 3 shows a flow chart of an example method of determining locations of an input device in different states.

FIG. 3 is a flow chart of an example method 300 of estimating a position of an input device. For example, method 300 may be performed by a computing device, such as display device 102 of FIGS. 1A-1C and/or display device 202 of FIG. 2. In additional or alternative examples, method 300 may be performed by a combination of the computing device and an input device, such as input device 104 of FIGS. 1A-1C and/or input device 212 of FIG. 2. As used herein, description relating to determining, estimating, calculating, indicating, and/or otherwise referencing a "position" and/or a "location" of a device may additionally or alternatively be applied to a "pose" of a device and vice versa. At 302, the method includes receiving position sensor data from a position sensor of an input device. At 304, the method optionally includes applying an offset to the position sensor data, which is described in more detail in FIGS. 4 and 5. For example, as described in more detail below with respect to FIGS. 4 and 5 and indicated at 306, the offset may be selected based on sensor data, a device state (e.g., a state of the computing/display device and/or a state of the input device), and/or a user of the input device. These and other offset-related considerations may be used to vary how the position sensor data is used to determine the estimated location.

In some examples, applying the offset may further include adjusting a sampling rate at which the sensor data is sampled based on the senor data, device state, and/or user. For example, the adjustment of the sampling rate may be performed based on the estimated location of the input device and/or an amount of time that has elapsed since the input device was in the home state. The sampling rate may be increased in conditions where increased drift or error is encountered (e.g., when an estimated and actual location of the input device differ by more than a threshold amount). The sampling rate may be decreased in conditions where decreased drift or error is encountered (e.g., when an estimated and actual location of the input device differ by less than a threshold amount).

At 308, the method includes generating and/or updating an estimated location of the input device based on the position sensor data (e.g., the position sensor data as offset at 304/306 in some examples). In some examples, the offset discussed above at 304 may additionally or alternatively be applied to the estimated location at 308. At 310, the method includes determining if the input device is in a home state. In some examples, the determination at 310 may be performed based on the generated estimated location (e.g., based on the position sensor data from the input device). In additional or alternative examples, the determination at 310 may be performed based on data from a sensing mechanism that is local to the computing device (e.g., the display device). For example, the determination at 310 may include determining whether the input device is within range of (e.g., detectable by) the local sensing mechanism of the computing device. If the device is not in the home state, the method returns to 302 to continue monitoring/tracking the pose of the input device based on information from the position sensor of the input device and updating an estimated location based on the pose information. In this way, the computing device may continuously (e.g., via a non- or limited-interruption stream of data) or periodically (e.g., at regular or irregular periods and/or based on a trigger such as a location or state of the input device, a state of the computing device, and/or a user request) receive the position sensor data and update the estimated location.

If the input device is determined to be in the home state (e.g., "YES" at 310), the method proceeds to 312 to determine, with the local sensing mechanism of the computing device, a home-state location of the input device. For example, as described above, the local sensing mechanism may include a touch sensor, hover sensor, proximity-based communication subsystem, and/or other proximity-based sensing mechanism of the computing device. Accordingly, the home-state location of the input device may be determined to be equal to the location and/or pose of the input device as detected by the local sensing mechanism while the input device is within range of the local sensing mechanism.

As another example, the local sensing mechanism may include a dock occupancy sensor that outputs an indication of whether the input device is positioned within and/or secured by a dock (e.g., dock 108 of FIG. 1A). The dock may have a known location relative to the computing device and/or may be sized/shaped to retain the input device in a known pose relative to the computing device. Accordingly, the home-state location of the input device may be determined to be equal to the known location and/or pose of the dock/input device retaining mechanism while the input device is positioned within the dock.

At 314, the method includes resetting the estimated location based on the home-state location. For example, the estimated location may be reset to be equal to the home-state location, or may be reset to be equal to a three-dimensional position and/or pose that is a function of the home-state location (e.g., taking into account tolerances or other adjustments to the home-state location due to the sensing mechanism of the computing device). While the input device is in an away state, the estimated location may be continually updated based on changes in the pose of the input device (as indicated by the position sensor of the input device) since a last-updated estimated location. Accordingly, resetting the estimated location to the home-state location ensures that, upon re-entering an away state, the movement data from the position sensor of the input device may be evaluated relative to a location/pose that has been determined based on the sensing mechanism of the computing device (which is typically more accurate than the estimation based on the position sensor of the input device over time).

At 316, the method includes controlling the computing device based on the estimated location. For example, a cursor may be displayed at a position that is based on the movement and/or position/pose of the input device. In an additional or alternative example, a selection or other user interface interaction may be performed based on the movement and/or position/pose of the input device. At 318, the method includes determining if the input device is still in the home state. For example, the determination at 318 may be performed in a similar manner to the determination at 310 (e.g., based on whether the computing device is able to detect the presence of the input device with the proximity-based local sensing mechanism and/or based on data from the input device). If the input device is still in the home state (e.g., "YES" at 318), the method returns to 312 to continue monitoring/tracking the position of the input device based on the local sensing mechanism of the computing device. If the input device is no longer in the home state (e.g., the input device has entered an away state), the method returns to 302 to monitor/track the position of the input device based on the position sensor of the input device. In this way, the estimated location of the input device may be continually updated based on a local sensing mechanism while in the home state and based on an input device-based position sensor while in the away state.

Figure 4:
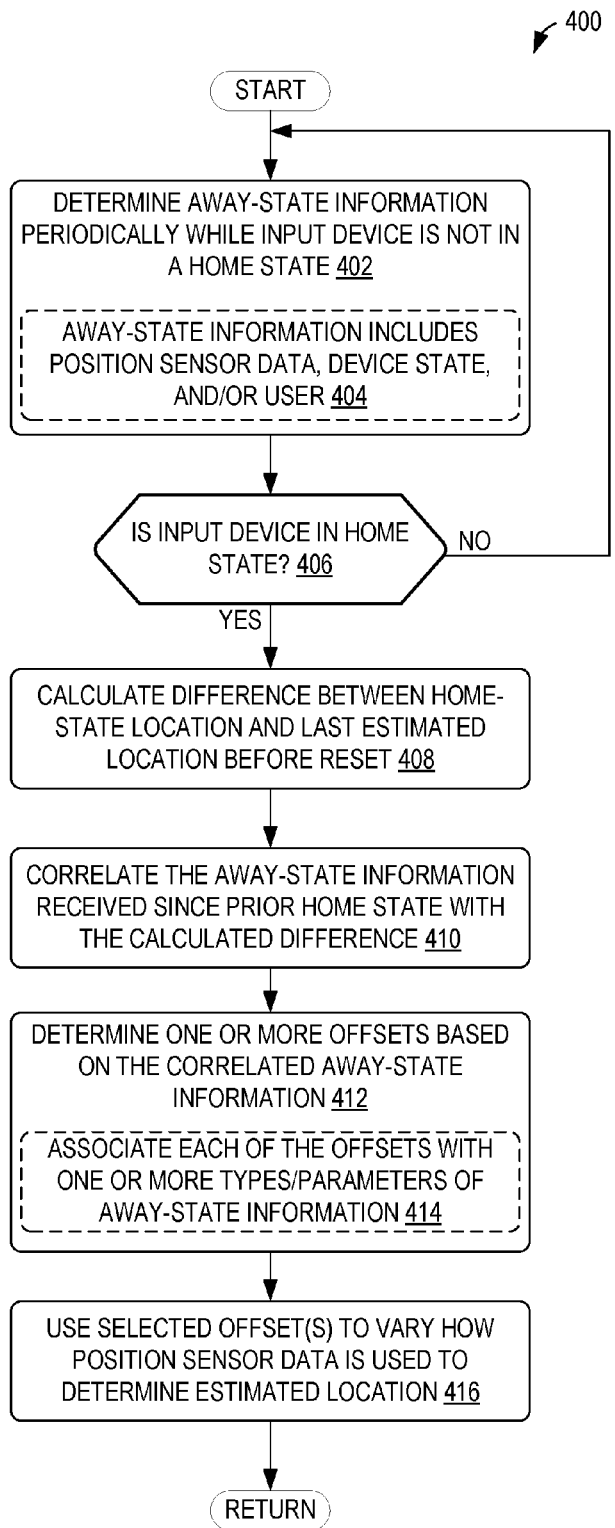
FIG. 4 shows a flow chart of an example method of performing adaptive learning to adjust estimations of a location of an input device.

FIG. 4 is a flow chart of an example method 400 for performing an adaptive learning technique to adjust estimations of a location of an input device. For example, method 300 may be performed by a computing device, such as display device 102 of FIGS. 1A-1C and/or display device 202 of FIG. 2. In additional or alternative examples, method 300 may be performed by a combination of the computing device and an input device, such as input device 104 of FIGS. 1A-1C and/or input device 212 of FIG. 2. At 402, the method includes determining away-state information periodically while the input device is not in a home state (e.g., while the input device is in an away state). As indicated at 404, the away-state information may include position sensor data, a device state(s) (e.g., of the input device and/or the computing/display device), and/or a current user(s) of the input device, as determined while the input device is in the away state.

At 406, the method includes determining if the input device is in a home state. The determination at 406 may be performed in a similar manner to the determinations of 310 and 318 of method 300 of FIG. 3 (e.g., based on whether the computing device is able to detect the presence of the input device with the proximity-based local sensing mechanism and/or based on data from the input device). If the device is not in the home state (e.g., "NO" at 406), the method returns to 402 to continue monitoring/tracking the away state information. If the device is in the home state (e.g., "YES" at 406), the method proceeds to 408 to calculate a difference between the home state location and the last estimated location before a reset (e.g., before performing the reset at 314 of method 300 of FIG. 3).

Figure 5:
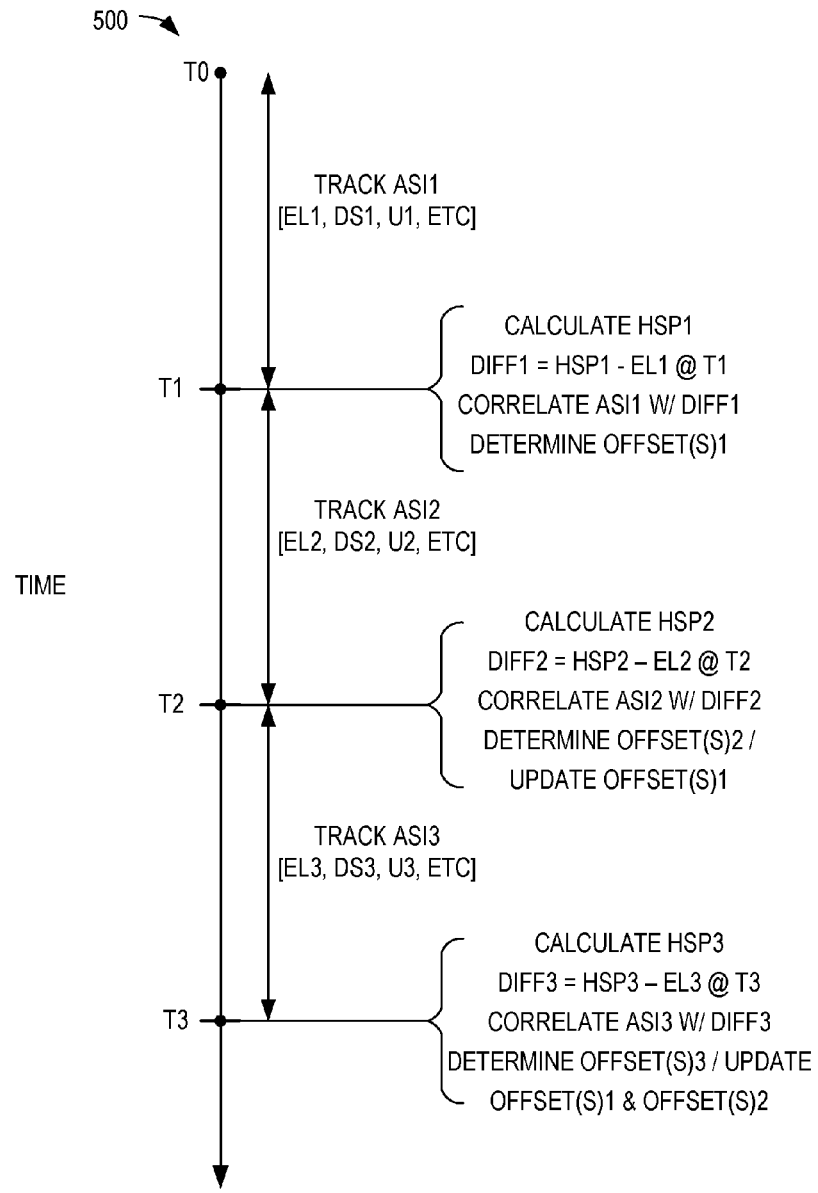
FIG. 5 shows a timeline of an example location estimation calculation and adaptive learning routine.

At 410, the method includes correlating the away-state information received since the prior home state detection (e.g., since the input device last entered/left the home state) with the difference calculated at 408. At 412, the method includes determining one or more offsets based on the correlated away-state information. As indicated at 414, each of the offsets may be associated with one or more types and/or parameters of away-state information that was tracked during the time period that is associated with the offsets. Based on the association at 414, the determined offsets may be used to vary how the position sensor data is used to determine the estimated location, as indicated at 416. For example, the position sensor data may be adjusted by an offset selected based on an association of the offset with away-state information corresponding to that position sensor data. FIG. 5 shows an example timeline 500 that illustrates the correlation and offset determination and association of 410-414.

As shown in FIG. 5, a first set of away-state information (ASI1) may be collected/tracked between time T0 and time T1. This set of information may include data such as estimated location of the input device, device state (e.g., of the input device and/or the computing/display device), and user information (e.g., of a current user of the input device). The estimated location may be determined as described at 302-308 of method 300 of FIG. 3, and tracked over time in order to determine movements of the input device throughout the period from T0 to T1.

For example, the estimated locations may be analyzed to determine if there is a large amount of deviation between estimations. Such analysis may further be broken down to differentiate periods in which the estimated orientation of the input device changes frequently and periods in which the estimated distance of the input device from the display changes frequently. The changes in estimated location may also indicate changes in directionality (e.g., frequent movements toward and away from the computing/display device, frequent movements toward different sides or corners of the computing/display device, and/or other movements that include switching a direction by at least a threshold amount or a threshold number of times).

The device state data may track changes in the state of the computing device and/or the input device over time. Computing device states may include a power state, a state of the display (e.g., content that is displayed on the display), applications/operating systems executed on the computing device, an environment of the computing device, etc. Input device states may include a use state (e.g., whether the input device is providing gesture input, selection input, handwriting input, cursor control, and/or other types of input), a state of an actuatable element on the input device, a temperature of the input device, an environment of the input device (e.g., a room in which the input device is being moved), how long the input device has been in the away state, a maximum distance away from the computing device that the input device has moved, etc. For example, a temperature of the input device may increase as the input device comes closer to the display, and decrease as the input device moves further away from the display. Likewise, a temperature of the input device may increase as the time that the input device is held by the user increases. Such changes in temperature may thus at least generally indicate a relative location or status (e.g., in use and/or length of use) of the input device.

The current user may be tracked over time to determine which user or users are controlling the input device during the time period. A current user may be detected via user input (e.g., where a user identifies him/herself to the computing device/input device) and/or automatic detection (e.g., via fingerprinting or other biometric scanning, imaging of the user while the user is controlling the input device, and/or by other identifying mechanisms).

Times T0, T1, T2, and T3 all represent times at which the input device enters a home state (e.g., comes within a threshold distance of the computing device and/or enters a dock as described above). Accordingly, at time T1, the computing device may calculate a home-state position for that time point, as described above at 312 of method 300 of FIG. 3. The computing device may further calculate a difference DIFF1 between the calculated home-state position and the last-determined estimated location in time period T0-T1 (e.g., the estimated location determined closest to time T1 based on position information data from a position sensor of the input device).

The computing device may correlate the away-state information ASI1 with the calculated difference DIFF1. For example, the input device behavior, the state of the computing/display/input device, and/or the current user may affect the drift experienced by the position sensor and associated location estimation while the input device is in the away state. Over time, trends may be identified, which may be used to identify adjustments that may be made to estimated locations to compensate for drift experienced under certain conditions. Accordingly, one or more offset(s) 1 may be determined based on the correlation of the away-state information ASI1 with the calculated difference DIFF1. The offset(s)1 may be based in part on and/or equal to (e.g., an adjusted) calculated DIFF1.

As an illustrative example, if a large difference between a last-estimated location and a home-state position is calculated after the input device has been in an away state for over a threshold length of time, an offset may be determined which is equal to and/or a function of the difference. Thereafter, once the input device is determined to have been in the away state for over the threshold length of time, the offset may be applied to the position sensor data and/or to the estimation location determination for the input device in order to adjust the estimated location. As another non-limiting example, a particular value or range of values of location/position difference may be calculated multiple times (e.g., a number of times that is greater than an associated threshold) for a given user. Accordingly, that user may be associated with an offset that is equal to and/or a function of the particular value or range of values. Thereafter, each time the computing device identifies that user as a current user of the input device, the estimated location determination may be adjusted to include applying the offset associated with the user (see 304 and 306 of method 300 of FIG. 3, for example). Although shown as occurring at time T1 for illustrative purposes, the calculations and correlations described above may be initiated at time T1 and may occur between time T1 and time T1', where the difference between time T1 and time T1' corresponds to processing delays associated with performing the calculations and correlations. The processing performed at time T1 according to FIG. 5 may be understood to occur after tracking away-state information ASI1 (e.g., after the input device enters the home state) and before tracking away-state information ASI2 (e.g., before the input exits the home state after entering the home state at time T1).

The calculation and correlation may be performed on a per-time period basis, as shown with respect to time periods T1-T2 and T2-T3 in FIG. 5. However, the information gleaned from the evaluation of the away-state information in these time periods may be used to both determine new offsets and update existing offsets. For example, if an offset has already been determined for a particular user, and that user is controlling the input device during another time period, the away-state information and location difference calculation may indicate changes in the association between experienced drift and the current user. Accordingly, the offset associated with that user may be updated/adjusted based on the new information. For example, the calculated difference may be averaged with the calculated difference used to determine the offset in order to determine an updated value for the offset. Although the time periods illustrated in FIG. 5 appear to be of equal length for illustrative purposes, away-state information may be monitored within time periods based on home-state entries, which may occur at regular or, more likely in typical usage scenarios, irregular frequencies.

Utilizing the position sensor of an input device to track movements while the input device is away from a host computing device may allow the input device to be used over a wide range of input environments. For example, an input device may be used in a conference room to control a large display from multiple positions in the room. The accuracy of the tracking may be increased by periodically resetting the location estimation when the input device comes into range with a sensing mechanism that is capable of resolving the location of the input device to a greater degree of accuracy than the position sensor in the input device. The accuracy of the estimations while the input device is away from the computing device may further be increased by associating differences in location estimation and determination in home and away states with away-state information gathered during an associated time period.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
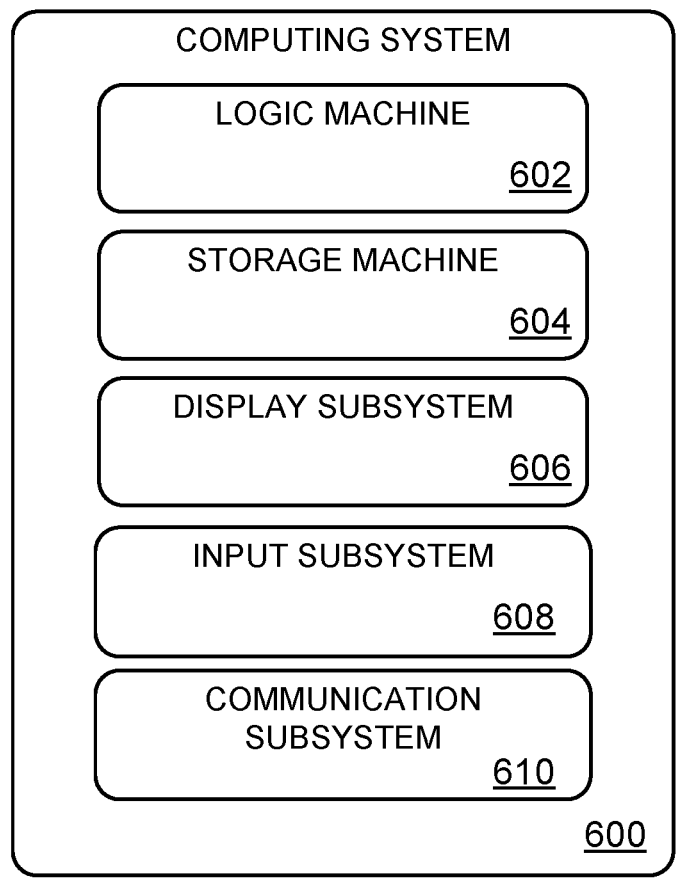
FIG. 6 shows a block diagram of an example computing system.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 602 executing instructions held by storage machine 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. The position sensor 214 and/or the sensing mechanism 210 of FIG. 2 may be examples of an input subsystem 608.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

Another example provides for a display device including a logic machine and a storage machine, the storage machine storing instructions executable by the logic machine to generate, based on position sensor data received from a position sensor of an input device, an estimated location of the input device relative to the display device that is repeatedly updated as further position sensor data is received, determine that the input device is in a home state associated with the display device, while the input device is in the home state, determine, with a sensing mechanism of the display device, a home-state location of the input device, reset the estimated location based on the home-state location, such that future updates to the estimated location are based on the reset estimated location, and control the display device based at least on the estimated location of the input device. Such an example may additionally or alternatively include the display device, wherein the home state corresponds to the input device having a position within a dock associated with the display device, the dock having a known location relative to the display device. Such an example may additionally or alternatively include the display device, wherein the home state corresponds to the input device having a position within a threshold distance of the display device. Such an example may additionally or alternatively include the display device, wherein the position sensor of the input device includes an inertial measurement unit, and wherein the sensing mechanism of the display device includes one or more of a touch sensor, a hover sensor, and a proximity-based communication system. Such an example may additionally or alternatively include the display device, wherein the instructions are further executable to determine away-state information associated with when the input device is not in the home state, calculate a difference between: (a) the home-state location determined by the sensing mechanism when the input device enters the home state and (b) an estimated location determined prior to resetting the estimated location to the home-state location, correlate the away-state information with the calculated difference, determine one or more offsets associated with the away-state information based at least on the correlating, the one or more offsets having a value that is based at least on the calculated difference, and using at least one of the one or more offsets to vary how the position sensor data is used to determine the estimated location. Such an example may additionally or alternatively include the display device, wherein the away-state information includes one or more of a current user, a display state, an input device state, and estimated locations of the input device determined while the input device is not in the home state. Such an example may additionally or alternatively include the display device, wherein the instructions are further executable to adjust the selected offset based at least on a current temperature of the input device, and wherein applying the selected offset includes applying the adjusted selected offset. Such an example may additionally or alternatively include the display device, wherein the instructions are further executable to adjust a sampling rate at which position information is received from the position sensor based at least on one or more of the estimated location of the input device and an amount of time that has elapsed since the input device was in the home state. Any or all of the above-described examples may be combined in any suitable manner in various implementations.

Another example provides for a method for tracking an input device in three-dimensional space, the method including generating, based on position sensor data received from a position sensor of the input device, an estimated location of the input device relative to a display device that is repeatedly updated as further position sensor data is received, determining that the input device is in a home state associated with the display device, while the input device is in the home state, determining, with a sensing mechanism of the display device, a home-state location of the input device, resetting the estimated location based on the home-state location, such that future updates to the estimated location are based on the reset estimated location, and controlling the display device based at least on the estimated location of the input device. Such an example may additionally or alternatively include the method, wherein determining that the input device is in the home state includes determining that the input device is positioned within a dock associated with the display device. Such an example may additionally or alternatively include the method, wherein determining that the input device is in the home state includes determining that the input device is positioned within a threshold distance of the display device. Such an example may additionally or alternatively include the method, wherein the position sensor of the input device includes an inertial measurement unit, and wherein the sensing mechanism of the display device includes one or more of a touch sensor, a hover sensor, and a proximity-based communication system. Such an example may additionally or alternatively include the method, further comprising receiving away-state information associated with when the input device is not in the home state, calculating a difference between: (a) the home-state location determined by the sensing mechanism when the input device enters the home state and (b) an estimated location determined prior to resetting the estimated location to the home-state location, correlating the away-state information with the calculated difference, determining one or more offsets associated with the away-state information based at least on the correlating, the one or more offsets having a value that is based at least on the calculated difference, and using at least one of the one or more offsets to vary how the position sensor data is used to determine the estimated location. Such an example may additionally or alternatively include the method, wherein the away-state information includes one or more of a current user, a display state, an input device state, and estimated locations of the input device determined while the input device is not in the home state. Such an example may additionally or alternatively include the method, further comprising adjusting the selected offset based at least on a current temperature of the input device, and wherein applying the selected offset includes applying the adjusted selected offset. Such an example may additionally or alternatively include the method, further comprising adjusting a sampling rate at which position information is received from the position sensor based at least on one or more of the estimated location of the input device and an amount of time that has elapsed since the input device was in the home state. Any or all of the above-described examples may be combined in any suitable manner in various implementations.

Another example provides for a method for tracking a stylus in three-dimensional space, the method including generating, based on position sensor data received from a position sensor of the stylus, an estimated location of the stylus that is repeatedly updated as further position sensor data is received, determining away-state information associated with the stylus being not in a home state associated with a display device, determining that the input device is in the home state, while the input device is in the home state, determining, with a sensing mechanism of the display device, a home-state location of the input device, resetting the estimated location based on the home-state location, such that future updates to the estimated location are based on the reset estimated location, calculating a difference between: (a) the home-state location determined by the sensing mechanism when the input device enters the home state and (b) an estimated location of the input device determined prior to resetting the estimated location, correlating the away-state information with the calculated difference, determining one or more offsets associated with the away-state information based at least on the correlating, the one or more offsets having a value that is based at least on the calculated difference, using one or more of the offsets to vary how the position sensor data is used to determine the estimated location, and controlling the display device based at least on the estimated location of the stylus. Such an example may additionally or alternatively include the method, wherein the selected offset is selected based at least on an association of the selected offset to one or more of a current user and a current display state. Such an example may additionally or alternatively include the method, further comprising adjusting a sampling rate at which position information is received from a position sensor based at least on one or more of the estimated location of the stylus and an amount of time that has elapsed since the stylus was in the home state. Such an example may additionally or alternatively include the method, wherein determining that the stylus is in the home state includes determining that the stylus is positioned within a dock associated with the display device and/or within a threshold distance of the display device. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display device including a logic machine and a storage machine, the storage machine storing instructions executable by the logic machine to:
   generate, based on position sensor data received from a position sensor of an input device, an estimated location of the input device relative to the display device that is repeatedly updated as further position sensor data is received;
   determine that the input device is in a home state associated with the display device;
   while the input device is in the home state, determine, with a sensing mechanism of the display device, a home-state location of the input device;
   reset the estimated location based on the home-state location, such that future updates to the estimated location are based on the reset estimated location; and
   control the display device based at least on the estimated location of the input device.

2. The display device of claim 1, wherein the home state corresponds to the input device having a position within a dock associated with the display device, the dock having a known location relative to the display device.

3. The display device of claim 1, wherein the home state corresponds to the input device having a position within a threshold distance of the display device.

4. The display device of claim 1, wherein the position sensor of the input device includes an inertial measurement unit, and wherein the sensing mechanism of the display device includes one or more of a touch sensor, a hover sensor, and a proximity-based communication system.

5. The display device of claim 1, wherein the instructions are further executable to:
   determine away-state information associated with when the input device is not in the home state;
   calculate a difference between: (a) the home-state location determined by the sensing mechanism when the input device enters the home state and (b) an estimated location determined prior to resetting the estimated location based on the home-state location;
   correlate the away-state information with the calculated difference;
   determine one or more offsets associated with the away-state information based at least on the correlating, the one or more offsets having a value that is based at least on the calculated difference; and
   using at least one of the one or more offsets to vary how the position sensor data is used to determine the estimated location.

6. The display device of claim 5, wherein the away-state information includes one or more of a current user, a display state, an input device state, and estimated locations of the input device determined while the input device is not in the home state.

7. The display device of claim 6, wherein the instructions are further executable to adjust the selected offset based at least on a current temperature of the input device, and wherein applying the selected offset includes applying the adjusted selected offset.

8. The display device of claim 1, wherein the instructions are further executable to adjust a sampling rate at which position information is received from the position sensor based at least on one or more of the estimated location of the input device and an amount of time that has elapsed since the input device was in the home state.

9. A method for tracking an input device in three-dimensional space, the method comprising:
   generating, based on position sensor data received from a position sensor of the input device, an estimated location of the input device relative to a display device that is repeatedly updated as further position sensor data is received;
   determining that the input device is in a home state associated with the display device;
   while the input device is in the home state, determining, with a sensing mechanism of the display device, a home-state location of the input device;
   resetting the estimated location based on the home-state location, such that future updates to the estimated location are based on the reset estimated location; and controlling the display device based at least on the estimated location of the input device.

10. The method of claim 9, wherein determining that the input device is in the home state includes determining that the input device is positioned within a dock associated with the display device.

11. The method of claim 9, wherein determining that the input device is in the home state includes determining that the input device is positioned within a threshold distance of the display device.

12. The method of claim 9, wherein the position sensor of the input device includes an inertial measurement unit, and wherein the sensing mechanism of the display device includes one or more of a touch sensor, a hover sensor, and a proximity-based communication system.

13. The method of claim 9, further comprising:
receiving away-state information associated with when the input device is not in the home state;
calculating a difference between: (a) the home-state location determined by the sensing mechanism when the input device enters the home state and (b) an estimated location determined prior to resetting the estimated location to the home-state location;
correlating the away-state information with the calculated difference;
determining one or more offsets associated with the away-state information based at least on the correlating, the one or more offsets having a value that is based at least on the calculated difference; and
using at least one of the one or more offsets to vary how the position sensor data is used to determine the estimated location.

14. The method of claim 13, wherein the away-state information includes one or more of a current user, a display state, an input device state, and estimated locations of the input device determined while the input device is not in the home state.

15. The method of claim 14, further comprising adjusting the selected offset based at least on a current temperature of the input device, and wherein applying the selected offset includes applying the adjusted selected offset.

16. The method of claim 9, further comprising adjusting a sampling rate at which position information is received from the position sensor based at least on one or more of the estimated location of the input device and an amount of time that has elapsed since the input device was in the home state.

17. A method for tracking a stylus in three-dimensional space, the method comprising:
generating, based on position sensor data received from a position sensor of the stylus, an estimated location of the stylus that is repeatedly updated as further position sensor data is received;
determining away-state information associated with the stylus being not in a home state associated with a display device;
determining that the stylus is in the home state;
while the stylus is in the home state, determining, with a sensing mechanism of the display device, a home-state location of the stylus;
resetting the estimated location based on the home-state location, such that future updates to the estimated location are based on the reset estimated location;
calculating a difference between: (a) the home-state location determined by the sensing mechanism when the stylus enters the home state and (b) an estimated location of the stylus determined prior to resetting the estimated location;
correlating the away-state information with the calculated difference;
determining one or more offsets associated with the away-state information based at least on the correlating, the one or more offsets having a value that is based at least on the calculated difference;
using one or more of the offsets to vary how the position sensor data is used to determine the estimated location; and
controlling the display device based at least on the estimated location of the stylus.

18. The method of claim 17, wherein the selected offset is selected based at least on an association of the selected offset to one or more of a current user and a current display state.

19. The method of claim 17, further comprising adjusting a sampling rate at which position information is received from a position sensor based at least on one or more of the estimated location of the stylus and an amount of time that has elapsed since the stylus was in the home state.

20. The method of claim 17, wherein determining that the stylus is in the home state includes determining that the stylus is positioned within a dock associated with the display device and/or within a threshold distance of the display device.

* * * * *